United States Patent [19]

Klee et al.

[11] 4,451,002

[45] May 29, 1984

[54] TEMPERATURE ACTUATED VALVE AND PHASE SEPARATION METHOD

[75] Inventors: David J. Klee, Emmaus; Peter C. Nelson, Macungie, both of Pa.

[73] Assignee: Air Products and Chemicals, Inc., Allentown, Pa.

[21] Appl. No.: 515,315

[22] Filed: Jul. 19, 1983

Related U.S. Application Data

[62] Division of Ser. No. 328,052, Dec. 7, 1981.

[51] Int. Cl.³ .............................................. G05D 23/02
[52] U.S. Cl. .................................. 236/101 R; 62/51; 236/102
[58] Field of Search ................. 236/93, 101 R, 102 R; 63/380, 51

[56] References Cited

U.S. PATENT DOCUMENTS

| Re. 28,712 | 2/1976 | Klee | 62/65 |
|---|---|---|---|
| 3,199,834 | 8/1965 | Short | 236/102 |
| 3,306,109 | 2/1967 | Caparone | 236/102 |
| 3,403,527 | 10/1968 | Berreth et al. | 62/380 |
| 3,427,820 | 2/1969 | Hart | 62/380 |
| 3,583,171 | 6/1971 | Flynn et al. | 62/266 |
| 3,613,386 | 10/1971 | Klee et al. | 62/64 |
| 3,813,895 | 6/1974 | Klee et al. | 62/374 |
| 3,845,635 | 11/1974 | Perkins et al. | 62/51 |
| 3,892,104 | 7/1975 | Klee et al. | 62/380 |
| 4,002,039 | 1/1977 | Cramer et al. | 236/102 |
| 4,171,625 | 10/1979 | Morgan et al. | 62/55 |

OTHER PUBLICATIONS

NASA, NASA Tech Brief, Apr. 1966, Brief 66-10136.

*Primary Examiner*—Ronald C. Capossela
*Attorney, Agent, or Firm*—Richard A. Dannells, Jr.; E. Eugene Innis; James C. Simmons

[57] ABSTRACT

The temperature actuated valve comprises a thermally more sensitive valve stem than the valve housing. The stem expands at a faster rate and causes vapor entering the valve to be gradually vented through an orifice of gradually increasing area as the temperature of the gas increases. It has application as a cryogenic phase separator valve which allows any cryogen vaporized in a cryogen delivery system to be automatically vented from the valve and to allow for an even flow of liquid to the spray nozzles and onto products of cryogenic freezing tunnels.

11 Claims, 5 Drawing Figures

TEMPERATURE ACTUATED VALVE AND PHASE SEPARATION METHOD

This is a division of application Ser. No. 328,052, filed Dec. 7, 1981.

TECHNICAL FIELD

This invention relates to a temperature actuated valve and phase separation method for incorporation, for example, in a cryogen delivery system of a cryogenic freezer. The valve is designed to separate liquid and vaporized cryogen and to release a build-up of vaporized cryogen and to maintain the cryogenic material entering the delivery system in a liquid state and at a uniform flow rate.

BACKGROUND OF THE PRIOR ART

A typical liquid cryogen delivery system for cryogenic freezing tunnels comprises elevated pressurized storage tanks, thermally insulated transfer lines, control valves, liquid-vapor phase separators and spray header assemblies. Because of the warming which occurs in the input system and pressure drops due to flow through the transfer lines and control valves, one of the problems of such tunnels is that a substantial volume of the cryogen, for example, liquid nitrogen (LIN), becomes converted to vapor by the time the cryogen enters the spray header assembly. The resulting two-phase mixture of vapor and LIN does not move in a smooth and predictable fashion, but rather tends to flow in volumetrically small slugs of LIN interspersed with volumetrically large slugs of vapor. When the stream of LIN having this heterogeneous unsteady flow is introduced into the spray header manifold, the product to be frozen is contacted alternately by liquid and then gaseous cryogen. Since liquid nitrogen has about twice the available refrigeration of gaseous nitrogen, this condition results in the most significant operating problem in freezing of the product, i.e. variations in the temperature of the frozen product.

Alternate delivery of liquid and gaseous nitrogen through the spray header causes an additional operating problem. The liquid and gaseous nitrogen pass through the orifices of the spray header at a different mass flow rate. The gas flow control system moves a volume of gas through the freezing tunnel at a rate equal to the liquid nitrogen flow rate. Gaseous nitrogen flows through the spray header at a much lower flow rate, causing room air to enter the freezer discharge opening. Room air entering the freezer will result in frost accumulation within the freezer and will also add an excessive heat input to the freezer.

Another problem of such freezers is that the conventional LIN transfer line may not deliver the same quality LIN to each freezer, especially if the horizontal portion of the transfer line is not perfectly level. The freezers receiving the poorest quality LIN, i.e. primarily gaseous nitrogen, will experience severe problems in freezing products such as food at the design production rate.

A conventional liquid-vapor phase separator in a cryogen delivery system consists of an insulated vessel, a bottom liquid withdrawal line, a top gas venting line, and a liquid level sensor. The level sensor is used to actuate a solenoid valve in the gas venting line. The pressure inside the insulated vessel will vary because of the opening and closing of the solenoid valve. Thus, the spray header mounted on the liquid withdrawal line will experience fluctuating pressure and varying liquid flow rates, which will result in non-uniform freezing of the products, which is especially a problem in food freezing.

Spray headers are found in the cryogenic freezing tunnels of the type described in the following U.S. Pat. Nos., Berreth et al., 3,403,527; Flynn et al., 3,583,171; Klee et al., 3,613,386; Klee, RE. 28,712; Klee et al., 3,813,895; Klee et al., 3,892,104; and Morgan 4,171,625. The Morgan et al. reference is the only one which addresses the problem of venting the build-up of cryogenic vapors in the cryogen delivery system and a solution thereto. In column 9, line 36 through column 10, line 3 of this reference, it is disclosed that spray header 156 serves as a phase separator for the gas and liquid phases of the cryogen and gas relief nozzles 160 having a given internal diameter. The nozzles are mounted on the top of the cryogen delivery tubes to allow the gas to escape. This creates an even flow of liquid out of the bottom and side of header 156 onto the products within the freezing tunnel below. The fixed diameter of the relief nozzles has the disadvantage of providing for the escape of only a fixed amount per unit time of vaporized cryogen. The diameter would have to be changed for changes in the cryogen flow rate or in the precent of cryogen that becomes vaporized due to pressure variations between the cryogen storage tank and the spray header or in the amount or type of insulation used throughout the cryogen delivery system in order to maintain the desired even flow of liquid onto the products within the freezing tunnel.

One method of overcoming the disadvantages of the relief nozzles of Morgan et al. is disclosed in NASA TECH BRIEF No. 66-10136 dated April 1966. The cryogenic trap valve disclosed in this reference comprises an aluminum valve housing and an Invar alloy valve stem. When this temperature actuated valve is filled with cryogenic liquid, the aluminum body is in its maximum contraction and the valve stem is seated in the outlet orifice of the valve. As the liquid vaporizes and the valve housing increases in temperature, the housing will expand while the Invar alloy stem remains of substantially the same dimension. This will allow the vapors to escape through the outlet orifice. This valve has substantially only one mode of venting capabilities, from a fully closed to a fully opened position. The slight movement of the valve body of this prior art valve, as the vapors increase in temperature, produces only a momentary throttling effect. The net effect of such a movement is to cause the device to operate essentially as an opened/closed system.

BRIEF SUMMARY OF THE INVENTION

The temperature actuated phase separator valve of the present invention overcomes the disadvantages of the prior art devices by including all of the advantages of eliminating moving parts and the dependence on external control systems of the prior art cryogenic phase separators while having the additional advantage of being able to operate in two separate and distinct modes depending on the amount of valve stem travel within the valve housing.

Accordingly, the apparatus of the present invention provides a temperature actuated valve which comprises a housing having an inlet at one end and an outlet orifice at the other end, a valve stem extending axially throughout the entire length of the housing, in which the valve stem comprises a material having a greater linear coefficient of expansion than that of said housing and a valve seal mounted on the end of the valve stem outside the outlet orifice and adjacent thereto for being seated in sealing engagement with the external surface surrounding the orifice when the valve is at its substantially lowest operable temperature.

The valve of this invention is designed so that when the valve is at room temperature and hence the valve stem is at maximum expansion, the annular area between the outer periphery of the valve stem, at least a portion of which has a cross-sectional area less than that of the outlet orifice, and the inner periphery of the outlet orifice is substantially equal to the radial area formed between the inner surface of the valve seat and the external surface encircling the orifice of the valve. Preferably, at room temperature this annular area is substantially less than the radial area. This allows the valve to operate in two distinct modes depending on the valve stem travel. In the first mode, the valve operates from a fully closed position to a position in which the inner surface of the valve seat extends away from the external surface around the outlet orifice during the time the valve stem lengthens from being warmed up due to the temperature of the gas within the valve and the area of the radial opening formed thereby becomes substantially equal to the annular area. The slow increase in the volume of cryogen released during this first mode is accommodated through the space provided by the slowly increasing radial area formed between the inner surface of the valve seat and the external surface about the outlet orifice. The second mode of operation exists at the point in time when the radial area first becomes equal to the annular area. The volume of gas that is released in the second mode is essentially constant and flows through the opening having a constant area formed by the annulus between the outer periphery of the valve stem and the inner periphery of the orifice in the end of the valve housing.

The advantage of this system over those of the prior art is that the valve stem comprising a thermoplastic material, e.g., polyethylene, having a substantially greater linear coefficient of expansion than the metallic housing, e.g., stainless steel, copper and the like, will gradually expand as the valve warms from the temperature of LIN, e.g. −195° C. (−320° F.), to some intermediate temperature during partial vaporization and will accommodate the release of an increasing volume of nitrogen gas through the gradually increasing size of the opening. After this intermediate temperature is reached, the maximum volume of nitrogen vapors per unit of time to be accommodated by the valve has been reached. The subsequent increases in temperature of the vapors and resulting expansion of the valve stem will not produce additional increases in the size of the opening and thus the rate of vapors released remains substantially constant.

DETAILED DESCRIPTION OF THE DRAWINGS

Figure 1:
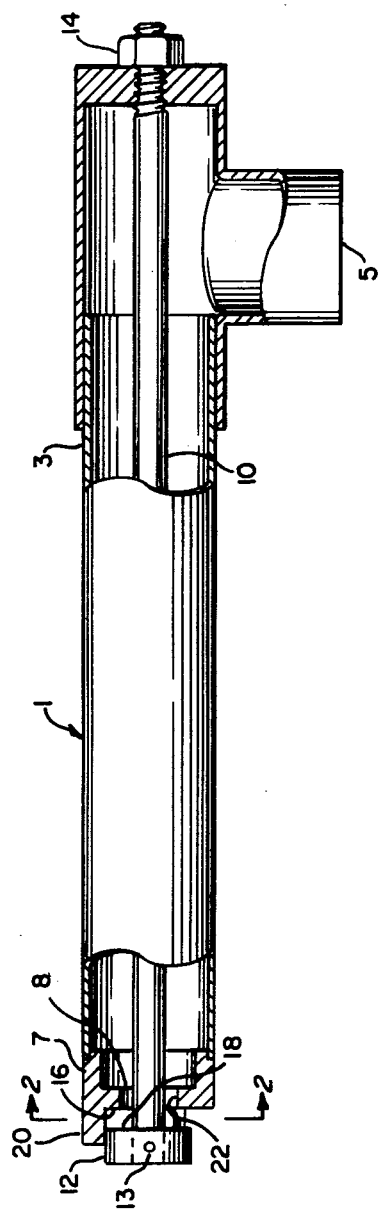
FIG. 1 is a longitudinal view, partially in cross-section, of a preferred embodiment of the valve of the present invention.
Figure 2:
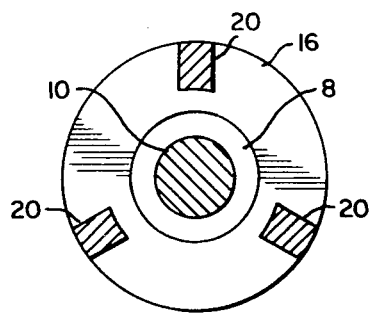
FIG. 2 is an end view of this valve through 2—2.
Figure 3:
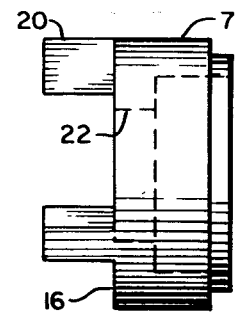
FIG. 3 is a detailed view of the outlet of this valve.
Figure 4:
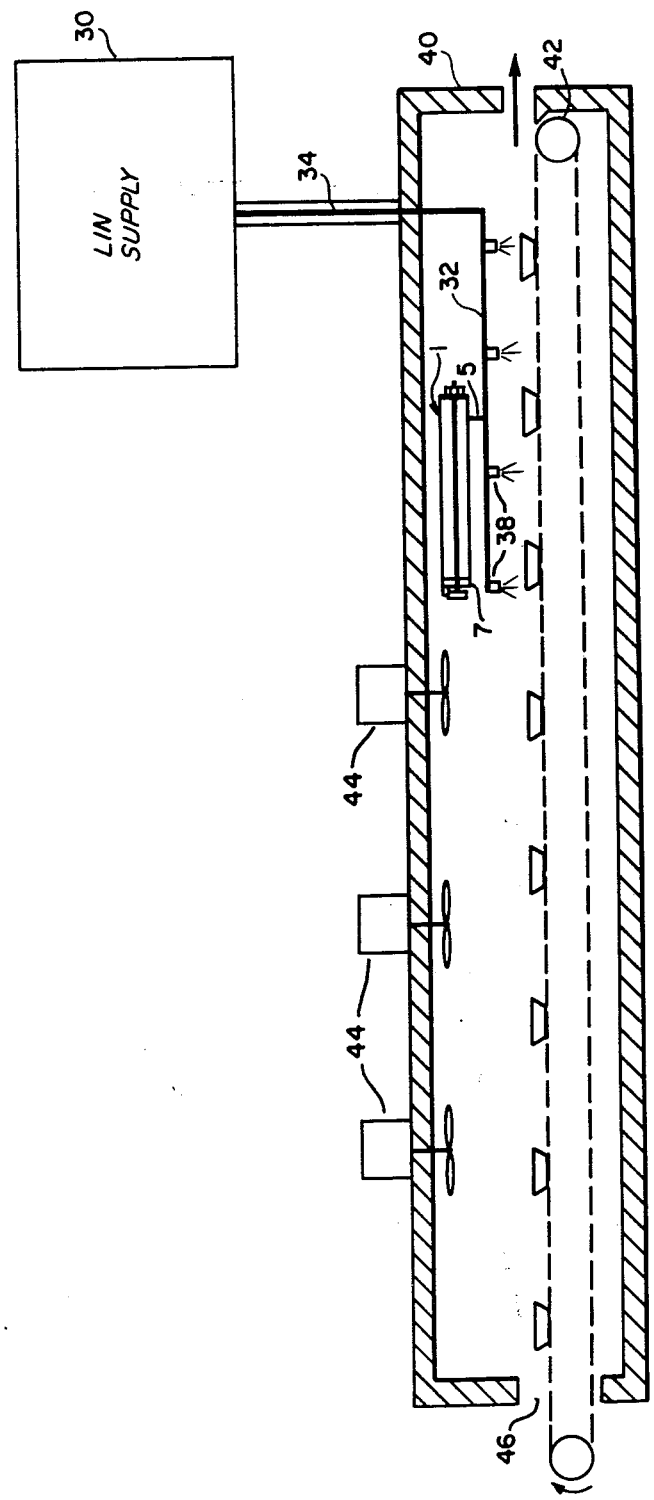
FIG. 4 is a schematic diagram of a typical cryogen delivery system showing a preferred use of this valve.

Referring now to FIGS. 1–3, phase separator valve 1 is shown comprising cylindrical housing 3 having inlet 5 for a cryogen and outlet 7 having orifice 8 therethrough. Housing 3 has a metallic composition, preferably copper. Outlet 7 also has a metallic composition, preferably brass. Valve stem 10 is threaded to one end of housing 3 and axially extends throughout its length. Valve seat 12, preferably of a soft material, e.g. a thermoplastic, to provide a tight seal when the valve is at its lowest operable temperature, is attached to the other end of stem 10 by means of pin 13. Valve seat 12 is axially adjusted by turning valve stem 10 and is secured by tightening nut 14 so that seat 12 remains a finite distance from external surface 16 encircling orifice 8 of housing 3. Valve 1 is mounted in the cryogenic delivery system so that inlet 5 depends downwardly from the remaining portion of housing 3 as shown in FIG. 4. Stem 10 comprises any thermoplastic material, such as polymeric fluorocarbons, polyolefins, polycarbonates, vinyl chloride polymers and the like, which has a much greater linear coefficient of expansion than the metallic composition of housing 3. Stem 10 contracts at a much greater rate then housing 3 as valve 1 cools down. Valve 1 is designed so that when an intermediate temperature, e.g. −39° C. (−38.2° F.), is reached, inner surface 18 is positioned away from external surface 16 and the resulting radial area is equal to the annular area formed between the outer periphery of stem 10 and the inner periphery of orifice 7. The required temperature range over which the nitrogen gas is throttled determines the desired length of valve stem 10. For example, in throttling between −192° C. (−313.7° F.), the temperature of LIN at 398 mm Hg (7.7 psig.), and −39° C., this length has been calculated to be 16.04 cm. (6-5/16 inches). This provides a distance between surfaces 16 and 18 of 0.1321 cm. (0.052 inch) when the temperature reaches −39° C. As the temperature of valve 1 decreases toward −192° C. the area for the escape of vaporized LIN continues to decrease until inner surface 18 rests securely against surface 16. If there is any escape of vapor when valve 1 becomes filled with LIN and the temperature is at its lowest operable point, adjustment is made by loosening nut 14, turning stem 10 and retightening nut 14. This provides a secure seal between surfaces 16 and 18 and makes up for any small variations in the thermal contraction of the materials used in its construction or manufacturing tolerances of the machine parts including valve stem 10.

Alignment projections 20 are provided on outlet 7 as clearly shown in FIG. 3, to maintain valve stem 10 in an axially aligned position with respect to the axis of housing 3. These projections are positioned in such a way to avoid any interference with the escaping gas from valve 1. The annular area between the outer periphery stem 10 and horizontal sidewalls 22 of orifice 8 is calculated so that the maximum rate of gaseous cryogen can be vented within the insulated freezer as shown in FIG. 4 based on the maximum percent of liquid cryogen that is vaporized at the maximum pressure drop across the cryogen delivery system from cryogen supply tank 30 to spray header system 32.

Referring now to FIG. 4, LIN is supplied from LIN supply tank 30 to spray header 32 through insulated line 34. LIN flows through each of the individual spray nozzles 38 of header 32 within insulated freezing tunnel 40 onto the food products to be frozen on endless conveyor belt 42. The gaseous portion of the LIN flows through inlet 5 to phase separator valve 1 described above. The nitrogen vapors through outlet 7 are vented within freezer 40. Recirculation fans 44 are provided along a portion of the length of freezer 40 starting at the end of freezer 40 adjacent food products inlet 46 in a manner well known in the art.

The following non-limiting example describes testing separator valve 1 shown in FIGS. 1-4.

EXAMPLE

LIN phase separator valve 1 was designed so that adjustable valve stem 10 made of TEFLON fluorocarbon was positioned within housing 0.1588 cm. (1/16 inch) from sidewalls 22 of orifice 8. Stem 10 had a circular cross-section of 0.635 cm. (¼ inch) and orifice 8 had a diameter of 0.953 cm. (⅜ inch). Inner surface 18 of valve seat 12 made of an ultra high molecular weight (UHMW) polyethylene was positioned 0.318 cm. (⅛ inch) from exterior surface 16 encircling orifice 8 when the valve was at room temperature. When the temperature of valve 1 was reduced to −192° C. at 398 mm Hg, indicating the presence of liquid nitrogen, valve seat 12 was in its fully closed position. Surfaces 16 and 18 were brought into intimate contact in a manner described above.

As the valve filled with gas, the temperature rose slightly allowing seat 12 to crack open and release the nitrogen gas through outlet 7 into freezer 40, a CRYOQUICK® Food Freezer, Model No. R3-3021-PO, manufactured by Air Products and Chemicals, Inc. Separator 1 was sized to vent 54.6 kg./hr. (120 lbs./hour) of nitrogen gas at 362 mm Hg (7 psig) when surface 18 was opened to a position 0.1321 cm. from surface 16. The flow rate of 54.6 kg./hr. was the amount of nitrogen gas generated when 1135 kg. (2495 lbs.) of LIN/hour were expanded from 1293 mm Hg (25 psig) to 362 mm Hg. When valve stem 10 traveled beyond 0.1321 cm. to its maximum 0.318 cm. position, the flow of vapors were resticted only by the annular opening which in this case was equivalent to about 0.387 cm.$^2$ (0.06 square inches). During the test run, LIN at a storage pressure of 1914 mm Hg (37 psig) flowed to the LIN freezer delivery system. The pressure of LIN spray header 32 remained at a constant of 310±12.9 mm Hg (6±¼ psig) and the temperature adjacent to the outlet of the LIN spray nozzles 38 was recorded at −193° C. (−315° F.). During this period, liquid nitrogen was observed to flow from the nozzles and simultaneously gaseous nitrogen was observed to flow from outlet 7 when a hinged top cover (not shown) in freezer 40 was lifted. A completed description of the CRYOQUICK Freezer used in this test can be obtained by referring to Klee et al., U.S. Pat. No. 3,813,895, the description of which is incorporated herein by reference.

Figure 5:
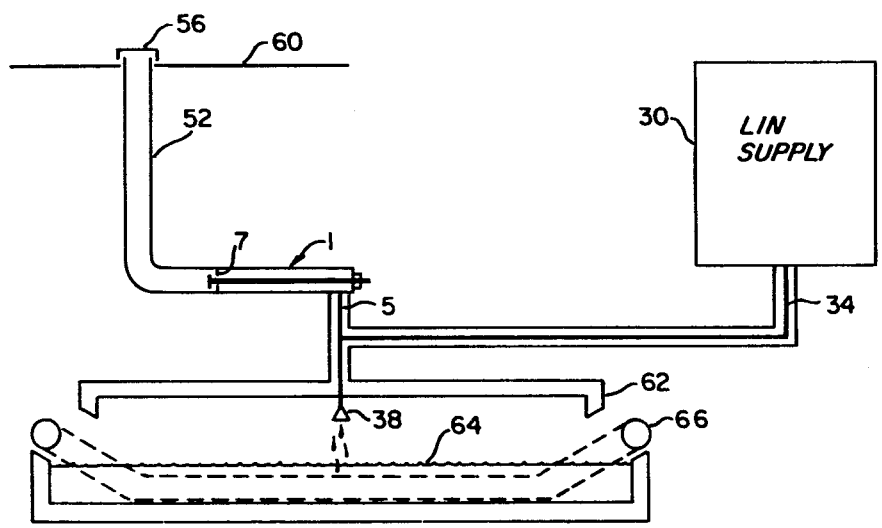
FIG. 5 is a schematic diagram of a cryogen delivery system showing an alternative use of this valve.

For applications that utilize the latent heat of liquid nitrogen only, such as a LIN immersion tank as shown in FIG 5, or a LIN cold trap, the gaseous nitrogen from the LIN delivery system is vented to the atmosphere through, insulated inlet 5 and outlet 7 of phase separator valve 1, vent line 52, one end of which is mounted around outlet 7, and vent 56 in roof 60 of the building containing the insulated freezing tank 62. In this embodiment of the present invention, LIN liquid level 64 in tank 62 is maintained by the cryogen delivery system of the type described above in connection with FIG. 4. Specifically, LIN from supply tank 30 flows through insulated line 34 to spray nozzle 38. In the embodiment of FIG. 5, a single nozzle will suffice to maintain level 64 through the use of a liquid level controller (not shown) which is well known in the art. The main objective of such a controller system is to assure that the product is immersed in LIN for a substantial portion of its travel on endless conveyor belt 66.

What is claimed is:

1. A temperature actuated valve which comprises a housing having at one end thereof an inlet and at the other end an outlet orifice, a valve stem axially extending through the length of said housing, said stem comprising a material having a greater linear coefficient of expansion than that of said housing and at least a portion having a cross-sectional area less than that of said outlet orifice, and a valve seat mounted on said portion of said valve stem outside of and adjacent to said outlet orifice and seated in sealing engagement with said orifice when said valve is at its substantially lowest operable temperature.

2. The valve as in claim 1 wherein the annular area formed around the outer periphery of said valve stem and the inner periphery of said outlet orifice is substantially equal to the radial area formed between the inner surface of said valve seat and the external surface encircling said outlet orifice when said valve is at room temperature.

3. The valve of claim 2 wherein said radial area is substantially greater than said annular area at room temperature.

4. The valve of claim 1 wherein said valve seat comprises a soft material for forming a tight seal when said valve is at its substantially lowest operable temperature.

5. The valve of claim 1 wherein said valve stem is adjustably attached to the end of said housing adjacent to said inlet.

6. The valve of claim 1 wherein alignment means are provided on the external surface of said outlet orifice for maintaining the axial alignment of said valve stem within said housing.

7. The valve of claim 1 wherein said inlet depends downwardly from the remaining portion of said housing.

8. The valve of claim 1 for use as a liquid-vapor phase separator in a cryogen delivery system.

9. The valve of claim 8 wherein the size of said annular area is selected so that gaseous cryogen is vented at the desired rate for the desired operated pressure of said cryogen delivery system.

10. The valve of claim 9 positioned within a cryogen freezer so that gaseous cryogen is vented into said freezer.

11. The valve of claim 9 wherein vent line means is mounted around the end of said housing through which the outlet orifice passes for venting the gaseous cryogen directly to the atmosphere.

* * * * *